US005212218A

United States Patent [19]

Rinehart

[11] Patent Number: 5,212,218

[45] Date of Patent: May 18, 1993

[54] HYDROPHOBIC, ERODIABLE SYNTHETIC RESIN COMPOSITION FOR ELECTRICAL INSULATORS

[75] Inventor: William M. Rinehart, Centralia, Mo.

[73] Assignee: A. B. Chance Company, Centralia, Mo.

[21] Appl. No.: 775,461

[22] Filed: Oct. 15, 1991

[51] Int. Cl.[5] ............ C08K 5/10

[52] U.S. Cl. ............ 523/455; 174/110 E; 523/465; 524/487

[58] Field of Search ............ 523/455, 463, 464, 465, 523/457; 174/110 E; 524/487

[56] References Cited

U.S. PATENT DOCUMENTS 3,838,055 9/1974 Rinehart ............ 174/209
4,025,693 5/1977 Milne ............ 428/907
4,206,066 6/1980 Rinehart .

FOREIGN PATENT DOCUMENTS 1094706 1/1981 Canada ............ 523/455

OTHER PUBLICATIONS

Material Safety Data Sheet; Epi-Rez 510, Hi-Tek, issued Sep. 17, 1988.
Witco Chemical, Sonneborn Division Brochure; "Petrolatum".
Dixie Chemical Company Material Safety Data Sheet; ECA-100h; Dec. 28, 1987.
Cyanamid Material Safety Data Sheet; CYASORB UV-531 Light Absorber; Oct. 4, 1989.
Ashland Chemical Company Material Safety Data Sheet; Ethylhexoic Acid-2; Sep. 27, 1988.
Lindau Chemicals, Inc. Material Safety Data Sheet; Benzyldimethylamine; Feb. 25, 1991.
Solem Industries, Inc., SB-36 Alumina Trihydrate; Material Safety Data Sheet Feb. 19, 1990.
Molded Electrial Connectors; Spenadel, et al.; pp. 26-33, *Rubber Age*, Aug. 1974.
CA 104113c, vol. 114, 1991; Diene Rubber Compositions for Surfaces of Interior Materials.
CA 175918t, vol. 111, 1989; Polymer composition for contact with sliding parts.
CA 77219a, vol. 110; 1989; Use of synthetic petroleum resin SPP in rubber mixtures.
CA 41523u, vol. 107, 1987; Rubber compositions.
CA 6973k, vol. 9, 1983; Flexible insulation with improved discoloration and heat age resistance.
CA 122465b, vol. 86, 1977; Laminates for corrosion prevention.
CA 44567v, vol. 86, 1977; Production of porous sole rubbers based on SKEPT.
CA 109831c, vol. 85, 1976; Carbon black-free blend for manufacture of porous materials.

(List continued on next page.)

*Primary Examiner*—Melvyn I. Marquis
*Assistant Examiner*—D. Aylward
*Attorney, Agent, or Firm*—Hovey, Williams, Timmons & Collins

[57] ABSTRACT

Improved synthetic resin insulators having enhanced arc track resistance and reduced UV light degradation characteristics are provided which include a continuous resin phase and a discrete, discontinuous hydrophobic phase in the form of discrete, suspended droplets within the resin. The preferred insulators are formed of a continuous epoxy matrix having suspended droplets of petrolatum dispersed therein. The resin phase comprises from about 15 to 50% by weight of the composition, whereas the hydrophobe is present at a level from about 2 to 10% by weight. UV light resistance is improved by predissolving or predispersing a quantity of UV light absorber in the hydrophobe before the latter is mixed with the resin phase. Use of a hydrophobe which is solid at normal temperatures but which melts above about 80° F. (such as petrolatum) results in lower dust attraction during ordinary conditions and the ability to melt and effectively encapsulate surface dust during periods of increased arcing activity.

19 Claims, No Drawings

OTHER PUBLICATIONS

CA 7056m, vol. 85, 1976; Bonding of vulcanized rubber.
CA 65106g, vol. 75, 1971; Closed-cell ethylene-propylene diene monomer sponge composition.
CA 143105b, vol. 74, 1971; Ethylene-propylene copolymers-wax masterbatches for extremely unsaturated rubbers.
CA 148918m, vol. 111, 1989; Active agents such as pharmaceuticals and pesticides entrapped in polymethacrylate lattices.
CA 87507c, vol. 111, 1989; Pressure-sensitive printer ribbons for dot matrix printing.
CA 212813w, vol. 101, 1984; Formation of corrosion-resistant layers of petrolatum compositions.
CA 35547u, vol. 100, 1985; Polyamide hot-melt adhesives.
CA 39940a, vol. 99, 1983; Antifouling coating materials.
CA 40419y, vol. 98, 1983; Solid entrapped emollient-moisturizer composition and its use.
CA 159177p, vol. 91, 1979; Urehtane polymer-based sealing compositions.
CA 73049t, vol. 78, 1973; Filled polyurethane compositions capable of working under frictional conditions without a lubricant.
CA 127442r, vol. 77, 1972; Impact-resistant polyvinyl aromatic compositions.
CA 46896u, vol. 76, 1972; Butadiene rubber-modified polystyrene.
CA 94523e, vol. 106, 1987; Electrically conductive alkali metal titanates.
CA 119380a, vol. 105, 1986; Protective mask composition for limiting the spread of solder in soldering of printed circuit boards.
CA 209286n, vol. 93, 1980; Ferroconcrete mold with a reinforced polymeric coating "Thermal Aging of an Insulating EPR-Rubber Compound", 1988 IEEE International Symposium; Jun. 5-8, 1988; Bartoli, et al.
Rubber World, vol. 177, Nov. 1, Oct., 1977, pp. 1, 56, 58, Processing aids boost production efficiency; Klingensmith.
Rubber Chemistry and Technology, vol. 57, Nov.--Dec., 1984, No. 5; Identification of Rubber Additives by Field Desorption and Fast Atom Bombardment Mass Spectroscopy; pp. 1013-1023.
Chance Brochure; Epoxilator II Insulators, Bulletin No. 12-8601; Apr. 1991.
Chance Bulletin No. 12-8803 EI; Type E Insulators.

HYDROPHOBIC, ERODIABLE SYNTHETIC RESIN COMPOSITION FOR ELECTRICAL INSULATORS

BACKGROUND OF THE INVENTION

1. Field of the Invention

The present invention is broadly concerned with improved synthetic resin insulators which present continuously renewable hydrophobic dielectric surfaces as a result of normal erosion thereof. More particularly, it is concerned with such insulators which include a continuous phase formed of a synthetic resin such as epoxy, urethane, or silicone rubber, with a discrete, discontinuous hydrophobic phase present in the continuous resin phase as discrete, suspended droplets of hydrophobic material. In preferred forms, the hydrophobic material employed is petrolatum, and additional advantages are obtained when a UV absorber is predissolved or predispersed in the petrolatum prior to incorporation into the continuous synthetic resin phase.

2. Description of the Prior Art

Elongated insulators of various configurations are a staple part of electrical transmission and distribution systems. Although porcelain has long been the material of choice for high voltage outdoor insulators, considerable research has been conducted in the past to develop acceptable synthetic resin insulators. In general, prior resin insulators have proven to be deficient in one or more important areas such as arc track resistance, weatherability, impact strength or castability. Indeed, one of the most demanding applications of polymeric resin materials is in the context of outdoor high voltage insulators.

The most popular polymer resin insulator materials are the epoxies, silicone rubbers, urethanes, and ethylene propylene diene modified rubbers (EPDM). All of these materials can perform well in the field when properly formulated. However, in order to provide an adequate degree of arcing resistance, aluminum trihydrate (ATH) is often used in these resin formulations. As natural erosion of the insulators occur, ATH is continually present on the insulator surface, thereby providing the continuing degree of arc resistance. A drawback of ATH use, however, is the fact that the material is hydrophilic, and the surfaces of insulators including ATH tend to wet out as soon as the initial resin-rich surface erodes away due to weathering or electrical stress. This characteristic wetting out permits the buildup of contaminants on the insulator surface, thus lowering the dielectric capability of the insulator.

In response to this wetting out problem, it has been known to incorporate silicone oil as an additive into resin matrices formed of epoxy for example. Silicone oil is naturally hydrophobic and assists in maintaining surface hydrophobicity on an insulator even after erosion due to weather and/or arcing activity. However, silicone oil stays liquified over a large temperature range. Thus, when the insulator surface erodes and exposes silicone oil, the liquid state of the oil tends to attract dust and encapsulate it. Eventually the silicone oil will become saturated with dust and arcing activity will increase. Moreover, the liquid silicone tends to roll like a bead across a wetted insulator surface and fall to the ground, thereby failing to re-establish the hydrophobicity of the insulator surface.

Many polymer systems can be effectively stabilized for resistance to sunlight by the addition of UV absorbers into the resin matrix. However, certain polymer systems, and especially the epoxies, are difficult to stabilize in this way. Epoxies are such strong UV absorbers that conventional UV stabilizers are not very effective. Accordingly, a prime deficiency of prior epoxy insulators has been their degradation due to UV absorption.

U.S. Pat. Nos. 4,206,066 and 3,838,055 describe prior polymeric insulators. In addition, an article entitled "Molded Electrical Conductors" by Spenadel, et al. and appearing in the August, 1974 issue of *Rubber Age* at pages 26–33 describes EPDM insulators including plasticizers such as petrolatum, oil and wax. In such applications, the hydrocarbon-based plasticizers are compatible with aliphatic-type resins like EPDM, and therefore are effectively dissolved or dispersed within the resin and do not form discrete, migratible droplets.

SUMMARY OF THE INVENTION

The present invention provides a greatly improved insulator dielectric composition for insulator fabrication, wherein the composition comprises a continuous phase and a discrete, discontinuous hydrophobic phase. The continuous phase is preferably selected from the group consisting of epoxy, urethane and silicone rubber resin and mixtures thereof, with the hydrophobic phase being present in the continuous phase as discrete, suspended droplets. These droplets are formed of hydrophobic material and are advantageously selected from the group consisting of petrolatum, beeswax, and the petroleum, vegetable, synthetic and animal, greases, waxes and oils. The most preferred hydrophobe is petrolatum, although in a more general sense, it is preferred to employ hydrophobes which are substantially solid at room temperature but which melt at a temperature above about 80° F. In any event, the hydrophobes must be completely fluid at temperatures below about 190° F.

In another aspect of the invention, an additive is provided for addition to a continuous resin phase in order to form a two-phase insulative composition This additive comprises a quantity of hydrophobic material as described previously, with a quantity of an ultraviolet light absorber dissolved or dispersed therein. Actual test results have demonstrated that predissolving or predispersing the UV absorber in the hydrophobe give superior UV resistance in the final insulator body.

DESCRIPTION OF THE PREFERRED EMBODIMENTS

The insulative bodies of the invention can be formed in virtually any desired configuration. One common insulator would be an elongated, skirted insulator adapted for external use in electrical transmission and distribution systems. In all cases, insulators pursuant to the invention have a continuous phase and a discrete, discontinuous hydrophobic phase, wherein the hydrophobic phase is present as discrete, suspended droplets of hydrophobic material having an average diameter of from about 0.05 to 0.5 mm. Advantageously, the continuous phase resin is present in the insulator at a level of from about 15 to 50% by weight, and more preferably from about 20 to 30% by weight. Correspondingly, the hydrophobic phase is present at a level from about 2 to 10% by weight, and more preferably from about 4 to 6% by weight.

The most preferred continuous phase resin is selected from the epoxies. In this connection, particularly good results have been found in a use of an epoxy blend containing 80% by weight of an alkyl aryl epoxy and 20% by weight of a BPA epoxy. Exemplary resins of this character useful in the invention are the commercially available Epi Rez 50729 and 510 resins. The former product is a modified bisphenol-A polyglycidyl ether resin containing about 80% by weight aliphatic triglyceride triglycidyl ether resin (CAS #74398-71-3), about 20% bisphenol-A epoxy resin (CAS #25068-38-6) and less 0.1 % by weight epichlorohydrin (CAS #106-89-8). The Epi Rez 510 product consists of diglycidyl ether of bisphenol-A (CAS #25068-38-6).

The preferred hydrophobe is petrolatum, which is a mixture of both solid and liquid hydrocarbons, and is solid at ordinary temperatures. Petrolatum is closely related to microcrystalline and paraffin wax in chemical composition. The three are distinguished as follows: microcrystalline wax is a solid hydrocarbon mixture of microcrystalline structure, having an ASTM consistency of below 85 and a kinematic viscosity at 210° F. above 5.75 centistokes. Petrolatum is a soft type microcrystalline wax having an ASTM consistency above 85. Finally, paraffin wax is a solid hydrocarbon mixture of crystalline structure having a kinematic viscosity at 210° F. below 5.75 centistokes. From a chemical standpoint, petrolatum is a colloidal system in which the solid wax is the external phase and the oil the internal phase. The wax absorbs the oil just as gelatin absorbs water; the result being a swollen jelly-like mass. Petrolatum offers a number of advantages over silicone oil as a hydrophobe. Among these are increased resistance to dust buildup on an insulator surface, reduced tendency to increase the viscosity of the resin systems (thereby permitting a higher concentration of the hydrophobe and hydrated alumina into the resin mix), and significantly lower cost (about $0.66 per pound for petrolatum, versus over $4.00 per pound for silicone oil).

A variety of petrolatum products can be used in the invention, but commercially available Alba Protopet USP petrolatum having a USP congealing point of 112/122° F., a consistency (USP or ASTM) of 180/210, a Saybolt viscosity at 210° F. of 60/80, a flash point of 410/420, a Lovibond 2" cell value of 3/4 Y, and a white NPA color. This product is available from Witco Chemical, Sonneborn Division, of New York, N.Y. Petrolatums generally, as well as the above Alba Protopet product, are fully described in a brochure distributed by Witco Chemical entitled "Petrolatum." This brochure is incorporated by reference herein.

In addition to the continuous and hydrophobe phase, the preferred insulators include hydrated alumina to increase the arc track resistance thereof. The preferred filler is aluminum trihydrate, and is present at a level from about 50 to 85% by weight, and more preferably from about 70 to 80% by weight. The preferred ATH product is a mixture of two commercially available products, namely 60% by weight of the SB-36 (25 micron) product and 40% by weight of the UM-932 (3 micron) product. Both of these are sold by Solem Industries of Norcross, Ga.

Where epoxy is used as the continuous phase resin, curing agent(s), accelerator(s) and/or dispersants may be employed in the usual fashion. For example, in the preferred insulator formulation, ECA-100h epoxy curing agent is used, preferably in an amount of from about 4 to 14% by weight. This alicyclic anhydride material is sold by Dixie Chemical Company of Houston, Tex., and is a mixture of from about 25–30% by weight methyltetrahydrophthalic anhydride (CAS #34090-76-1), 45–50% by weight hexahydrophthalic anhydride (CAS #85-42-7), and 20–25% by weight methylhexahydrophthalic anhydride (CAS #25550-51-0). The preferred accelerator, used at a level of from about to 0.1 to 0.3% by weight comprises a 1:1 mixture of benzyldimethylamine (CAS #103-83-3) sold by Lindau Chemicals, Inc. of Columbia, S.C., and ethylhexoic acid-2 (CAS #149-57-5) sold by Ashland Chemical Company of Columbus, Ohio. Dispersants may be selected from the group consisting of commercially available products such as Tego Glide A11 (organically modified polysiloxane), Tego Glide 410 (polysiloxane polyether copolymer), Tego Airex (alkyl-aryl modified polymethyl siloxane), or BYK-310 (solution of a polyester modified polymethyl siloxane). The Tego products are commercialized by Tego Chemie Service USA, whereas the BYK-310 product is sold by BYK Chemie of Wallingford, Conn. These dispersants may be used at a level of from about 0.04 to 0.1% by weight.

In another aspect of the invention, it has been discovered that UV light absorbers may be advantageously predissolved or predispersed in the hydrophobe, prior to incorporation thereof into the continuous phase. Generally speaking, the hydrophobe (and particularly petrolatum as described previously) should comprise from about 98.0 to 99.8% by weight of the additive, and more preferably from about 99.4 to 99.7% by weight thereof, whereas the UV light absorber should comprise from about 0.2 to 2.0% by weight thereof, and more preferably from about 0.3 to 0.6% by weight. The preferred light absorber is a benzophenone, and specifically the UV-531 product sold by American Cyanamid Company of Wayne, N.J. This product is identified as 2-hydroxy-4-n-octoxybenzophenone. Advantageously, the hydrophobe/UV absorber additive should be used in the overall insulators of the invention at a level of from about 2 to 10% by weight, such that the insulators include from about 0.004 to 0.02% by weight UV absorber.

As noted previously. it is desirable that the hydrophobes used in the insulating compositions of the invention be solid at normal room temperature, while melting above normal ambient. Unlike silicone oil which stays in a liquified condition over a large temperature range, the preferred hydrophobes of the invention resist attracting dust particles while in the solid state. Thus, dust will wash off the insulator during rainy conditions. If, however, arcing activity increases to the point where the hydrophobe is warmed to its melting point (above 80° F. and preferably from about 88–137° F.), the dust will then be quickly encapsulated and hydrophobicity established. The arcing activity will then decrease, the surface of the insulator will cool, and the hydrophobe will resolidify and again resist attracting dust. Moreover, when the insulator surface is eroded and solid hydrophobe is exposed, the edge of the droplet will melt first The resultant fluid tends to elongate rather than cascading out of the insulator in the fashion of silicone oil. Accordingly, the hydrophobe has an increased tendency to displace water on the insulator surface.

Use of the hydrophobe as a carrier for UV absorbers also provides a number of significant advantages, particularly in the context of epoxy formulations. That is to say, it is very difficult to stabilize epoxies by the use of UV absorbers, inasmuch as the epoxy matrix itself is a significant UV absorber. However, it has been discovered that predissolving or predispersing the UV absorber in the hydrophobe phase, and using the stabilized solution as an extender in a resin system provides improved UV resistance. This is believed due to the distribution of the stabilized hydrophobe across the surface of the resin system, acting as a UV screen. In the case of epoxies, potentially damaging UV light is absorbed by the UV absorber in the hydrophobe before it gets to the underlying epoxy substrate. Furthermore, as the insulator surface erodes, the UV screen is reestablished continuously as the UV-stabilized hydrophobe migrates across the insulator surface. Finally, when use is made of the preferred hydrophobe petrolatum, UV absorber loadings can be increased, because petrolatum can effectively carry more of the absorber as compared with, for example, silicone oil.

The following examples describe the fabrication and testing of certain insulators in accordance with the invention. It is to be understood, however, that these examples are presented as illustrations only, and nothing therein should be taken as a limitation of the overall scope of the invention.

EXAMPLE I

In this test, the hydrophobicity of a series of comparative insulators was tested, as compared with a control having no hydrophobic phase. In each case, the insulators were formulated to include 100 parts by weight of an epoxy resin blend (95% by weight Epi Rez 50729 and 5% by weight Epi Rez 510), 39 parts by weight ECA-100h anhydride curing agent, 144.9 parts by weight (70%) aluminum trihydrate, 3 parts by weight BDMA accelerator, and variable amounts of the hydrophobes tested, as detailed below. The test insulators were manufactured by first preheating all ingredients except the hydrophobes to 170° F., followed by mixing of the liquid fractions and addition of the hydrophobe (where used) and filler. This mixture was then poured into a preheated mold and allowed to cure.

The hydrophobicity of the respective insulators was tested by the following technique:

(1) the resin rich surfaces of the samples were first wire-brushed and allowed to stand overnight to allow hydrophobe migration to occur.

(2) the dry samples were then weighed.

(3) the samples were then immersed in water while under vacuum to remove surface bubbles.

(4) the samples were then removed from the water and allowed to vertically drain for one minute, followed by shaking off of any water droplets from the bottom of the insulators.

(5) the wet samples were then weighed and the percentage of retained water was determined.

The following table outlines the results of this test:

| Hydrophobe | Concentration, PHR[1] | Weight Water Retained |
|---|---|---|
| None | 0 | 1.027 |
| Silicone Oil (5000 CKS) | 12 | 0.722 |
| Petrolatum | 25 | 0.626 |

[1]PHR = parts of hydrophobe per 100 parts of resin.

The above data demonstrates that the hydrophobicity of the cast epoxy insulator is improved by the use of both silicone oil and petrolatum. However, the petrolatum could be used at a higher concentration, and therefore gave improved performance.

EXAMPLE II

In this experiment, a number of epoxy insulators were cast using various hydrophobes, and the resulting insulators subjected to a tracking wheel test. The formulations used were exactly as set forth in Example I, except that the quantity of aluminum trihydrate was lowered to 330 parts by weight (65%).

In the tracking wheel test, the samples are mounted in a radial fashion on a rotatable hub, much like the spokes of a wheel. The wheel is rotated at 1 rpm and the samples are energized to 5 kV. At one part of the cycle, the samples are sprayed with a contaminated water solution which contains sodium chloride, a wetting agent, and sugar. The sugar forms a burnt char on the surfaces of the insulators. The test is concluded when the sample is deemed to have passed the test or catches fire or flashes over due to a conductive carbon path. The test is normally stopped after 400 hours. However, samples which are flammable or which exhibit poor arc track resistance usually fail within 40 hours, and many fail within as few as 2 hours. Any sample that resists flaming or flashover over 100 hours is deemed promising All of the samples of this test lasted the full 400 hours.

The efficiency of the various hydrophobes tested is indicated by the relative intensity of the arcing activity during the initial part of the test. These results are set forth below.

| Hydrophobe | Concentration PHR | Relative Surface Activity | | |
|---|---|---|---|---|
| | | 22.2 Hrs. | 23.3 Hrs. | 44 Hrs. |
| None | | None-Slt. | V. Slt.-Slt. | Mod |
| Silicone Oil (500 CKS) | 12 | None | None-V. Slt. | Mod |
| Petrolatum | 25 | None | None | V. Slt.-Slt. |

This data further confirms the fact that hydrophobicity of a cast epoxy insulator is improved by the presence of the selected hydrophobes. Petrolatum gave somewhat superior results, as compared with silicone oil.

EXAMPLE III

The relative ultraviolet light stability of cast epoxy insulator samples containing petrolatum and a UV absorber was determined. In each case, the test samples (0.5 inches thick and 2.25 inches in diameter) were formulated as described previously using a composition consisting of 100 parts of the epoxy resin blend of Example I; 39 parts by weight of the anhydride curing agent of Example I; 330 parts by weight aluminum trihydrate (65%); 25 parts by weight petrolatum; 3 parts by weight of the accelerator of Example I; and UV light absorber as indicated below. In one case, the UV absorber was predissolved or predispersed in the epoxy resin blend, and in the other, the UV absorber was predissolved or predispersed in the petrolatum, which was in turn suspended in the resin matrix.

The samples were tested using a QUV tester with the following cycle: 4 hours under UV light at 70° C., followed by 4 hours without UV light at 50° C. When exposed to UV light, epoxy insulators tend to chalk and be washed off the surfaces thereof. The aluminum trihydrate filler, however, tends to accumulate on the surface, probably due to its very small particle size (2 microns). The relative degradation of an epoxy insulator is therefore indicated by the amount of ATH on the surface thereof. The test results are set forth below.

| | Realtive Amount of ATH Deposited on Surface After 1000 Hours |
|---|---|
| 0.7 PHR UV-531[1] Predissolved or Predispersed in the Epoxy | Mod-Heavy |
| 0.7 PHR UV-531 Predissolved or Predispersed in the Petrolatum | Nil |

[1]UV-531 is a UV absorber sold by American Cyanamid Company and is recommended for epoxy resins.

The above data demonstrates that predissolving or predispersing the UV absorber in the hydrophobes offer better protection than predissolving or predispersing in the epoxy resin matrix. It is believed that this phenomenon is due to the hydrophobe forming a continuous coating on the surface, acting as a UV screen when the UV absorber is dissolved or dispersed in it.

EXAMPLE IV

In this study, the viscosities of hydrophobe-containing epoxy formulations were determined. In each case, the formulations included 100 parts by weight of the Example I epoxy resin blend; 39 parts by weight of the anhydride curing agent of Example I; 225 parts by weight of ATH; and hydrophobe as indicated below. After formulation, the viscosity of the respective samples was determined using conventional techniques, with the following results.

| | Viscosity @ 150° F. CPS | | | | |
|---|---|---|---|---|---|
| | PHR | | | | |
| Hydrophobe | 0 | 10 | 15 | 20 | 25 |
| 5000 CKS Silicone Oil | 2560 | 4570 | 5780 | — | — |
| 500 CKS Silicone Oil | 2560 | 4530 | — | — | — |
| Petrolatum | 2400 | — | — | 2680 | 2600 |

The foregoing table confirms that the viscosity of the resin system increases dramatically as the silicone oil level increases. This phenomenon is true with both low and high viscosity silicone oils. The maximum oil of silicone oil usable is about 15 PHR. However, the use of petrolatum increased the viscosity only marginally. A level of 25 PHR petrolatum was easily incorporated into the formulation, and the viscosity thereof remain relatively low. Accordingly, use of petrolatum as a hydrophobe is preferred.

I claim:

1. An insulative body having at least the outer portion thereof formed of a dielectric composition, said composition comprising a continuous phase, a discrete, discontinuous, hydrophobic phase, a minor amount of a dispersant, and a UV light absorber, said continuous phase being selected from the group consisting of the epoxy, urethane and silicone rubber resins and mixtures thereof, said hydrophobic phase being present in said continuous phase as discrete, suspended droplets, said droplets being formed of hydrophobic material which is substantially solid at room temperature but which melts at a temperature above about 80° F., said dielectric composition being formed by separately preparing an additive comprising a quantity of said hydrophobic material with said UV light absorber dissolved or dispersed therein, and thereafter incorporating said additive with the remaining ingredients of the dielectric composition.

2. The insulative body of claim 1, said hydrophobic material being selected from the group consisting of petrolatum, beeswax, and the petroleum, vegetable, synthetic and animal greases, waxes and oils.

3. The insulative body of claim 2, said hydrophobic material being petrolatum.

4. The insulative body of claim 1, said hydrophobic material being present as droplets having an average diameter of from about 0.05 to 0.5 mm.

5. The insulative body of claim 1, said continuous phase resin being present at a level of from about 15 to 50% by weight in said composition.

6. The insulative body of claim 1, said hydrophobic phase being present at a level of from about 2 to 10% by weight in said composition.

7. The insulative body of claim 1, said continuous phase resin being epoxy resin.

8. The insulative body of claim 1, said composition including a quantity of aluminum trihydrate therein.

9. The insulative body of claim 8, said aluminum trihydrate being present at a level of from about 50 to 85% by weight in said composition.

10. The insulative body of claim 1, including an ultraviolet light absorber dispersed in said composition.

11. The insulative body of claim 10, wherein said ultraviolet light absorber is dissolved or dispersed in said hydrophobic phase.

12. The insulative body of claim 1, said continuous phase comprising epoxy resin, said hydrophobic phase comprising petrolatum, and said composition further including an anhydride curing agent, and respective quantities of aluminum trihydrate and a ultraviolet light absorber.

13. An additive for addition to a continuous resin phase in order to form a two-phase insulative composition, said additive consisting essentially of a quantity of hydrophobic material which is essentially solid at room temperature but which melts at a temperature above about 80° F., said hydrophobic material having an ultraviolet light absorber dissolved or dispersed therein, said additive being essentially free of said resin prior to said addition thereof to the resin.

14. The additive of claim 13, said hydrophobic material being selected from the group consisting of petrolatum, beeswax, and the petroleum, vegetable, synthetic and animal greases, waxes and oils.

15. The additive of claim 14, said hydrophobic material being petrolatum.

16. The additive of claim 13, said ultraviolet light absorber being a benzophenone.

17. The additive of claim 16, said ultraviolet light absorber being 2-hydroxy-4-n-octoxybenzophenone.

18. The additive of claim 13, said hydrophobic material comprising from about 98.0 to 99.8% by weight of said additive.

19. The additive of claim 13, said ultraviolet light absorber comprising from about 0.2 to 2.0% by weight of said additive.

* * * * *